(12) United States Patent
Hamrock et al.

(10) Patent No.: US 8,206,874 B2
(45) Date of Patent: Jun. 26, 2012

(54) POLYMER ELECTROLYTES INCLUDING HETEROPOLYACIDS

(75) Inventors: Steven J. Hamrock, Stillwater, MN (US); Matthew H. Frey, Cottage Grove, MN (US); Michael A. Yandrasits, Hastings, MN (US); Gregory M. Haugen, Edina, MN (US); Andrew M. Herring, Nederland, CO (US); James L. Horan, Golden, CO (US); Niccolo V. Aieta, Denver, CO (US)

(73) Assignee: 3M Innovative Properties Company, Saint Paul, MN (US)

( * ) Notice: Subject to any disclaimer, the term of this patent is extended or adjusted under 35 U.S.C. 154(b) by 860 days.

(21) Appl. No.: 12/266,932

(22) Filed: Nov. 7, 2008

(65) Prior Publication Data

US 2009/0208809 A1 Aug. 20, 2009

Related U.S. Application Data

(60) Provisional application No. 60/986,749, filed on Nov. 9, 2007.

(51) Int. Cl.
*H01M 8/10* (2006.01)
(52) U.S. Cl. .................. 429/492; 429/493; 429/494
(58) Field of Classification Search .............. 429/492, 429/493, 494; 521/25, 30
See application file for complete search history.

(56) References Cited

U.S. PATENT DOCUMENTS

| | | | |
|---|---|---|---|
| 6,624,328 B1 | 9/2003 | Guerra | |
| 6,680,138 B1 * | 1/2004 | Honma et al. | 429/492 |
| 6,706,833 B1 | 3/2004 | Maatta et al. | |
| 7,285,349 B2 * | 10/2007 | Hamrock et al. | 429/428 |
| 7,348,088 B2 | 3/2008 | Hamrock et al. | |
| 7,572,534 B2 * | 8/2009 | Frey et al. | 429/494 |
| 7,622,220 B2 * | 11/2009 | Kim et al. | 429/188 |
| 7,838,138 B2 * | 11/2010 | Larson et al. | 429/494 |
| 2004/0116742 A1 | 6/2004 | Guerra | |
| 2006/0063054 A1 * | 3/2006 | Frey et al. | 429/33 |
| 2006/0159975 A1 | 7/2006 | Kim et al. | |
| 2007/0099052 A1 * | 5/2007 | Frey et al. | 429/33 |
| 2007/0099053 A1 * | 5/2007 | Frey et al. | 429/33 |
| 2007/0104994 A1 * | 5/2007 | Endoh et al. | 429/33 |
| 2008/0138685 A1 * | 6/2008 | Kaneko et al. | 429/33 |

(Continued)

FOREIGN PATENT DOCUMENTS

EP    1 085 038 A1    3/2001

(Continued)

OTHER PUBLICATIONS

PCT International Search Report, PCT/US2008/082783, 3 pages, Jan. 2010.

(Continued)

*Primary Examiner* — Helene Klemanski
(74) *Attorney, Agent, or Firm* — Gregory D. Allen

(57) ABSTRACT

This disclosure provides polymer electrolytes, polymer electrolyte membranes (PEM's) and membrane electrode assemblies (MEA's) such as may be useful in fuel cells which contain or comprise polyoxometalates (POM's) or heteropolyacids (HPA's). In some embodiments the polyoxometalate, it's counterions or both may comprise Mn and/or Ce. In some embodiments the polymer electrolyte is fluorinated. In some embodiments the polymer electrolyte comprises a second acidic functional group other than a polyoxometalate. In another aspect, the present disclosure provides methods of making polymer electrolytes including methods which comprising a step of copolymerizing monomers comprising a covalently bound polyoxometalates and methods which comprise a step of covalently attaching a polyoxometalate to the polymer.

29 Claims, 12 Drawing Sheets

U.S. PATENT DOCUMENTS

2008/0160380 A1* 7/2008 Hamrock .................. 429/33
2008/0299433 A1* 12/2008 Stanis et al. .................. 429/30

FOREIGN PATENT DOCUMENTS

| EP | 1 427 043 A1 | 6/2004 |
| EP | 1 772 919 A1 | 4/2007 |
| EP | 1 914 824 A1 | 4/2008 |
| WO | WO 03/073543 A2 | 9/2003 |
| WO | WO 2007/041473 A1 | 4/2007 |

OTHER PUBLICATIONS

Teze, A., Herve, G., G., α-,β-, and γ-Dodecatungstosilicic acids: isomers and related lacunary compounds. *Inorganic Syntheses*, 1990, 27, pp. 85-96.

Cowan, J. J.; Hill, C. L.; Reiner, R. S.; Weinstock, I. A., Dodecatungstoalumic acid and its lacunary and mixed addendum derivatives, *Inorganic Syntheses*, 1990, 33, pp. 18-26.

Judeinstein, P., Synthesis and Properties of Polyoxometalates Based Inorganic-Organic Polymers. *Chem. Mater*. 1992, 4, pp. 4-7.

* cited by examiner

POLYMER ELECTROLYTES INCLUDING HETEROPOLYACIDS

CROSS-REFERENCE TO RELATED APPLICATION

This disclosure claims the benefit of U.S. Provisional Patent Application No. 60/986,749, filed Nov. 9, 2007.

GOVERNMENT RIGHTS

The subject matter of this disclosure was made with Government support under Cooperative Agreement DE-FC36-02AL67621 awarded by the DOE. The Government has certain rights in this invention.

FIELD OF THE DISCLOSURE

This disclosure relates to polymer electrolytes, polymer electrolyte membranes (PEM's) and membrane electrode assemblies (MEA's) such as may be useful in fuel cells which contain or comprise polyoxometalates (POM's) or heteropolyacids (HPA's).

SUMMARY OF THE DISCLOSURE

Briefly, the present disclosure provides polymer electrolyte compositions comprising: a) a polymer electrolyte; b) a polyoxometalate; and c) a counterion to the polyoxometalate; where the polyoxometalate comprises a transition metal selected from the group consisting of Mn and Ce. In some embodiments the transition metal is Mn. In some embodiments the transition metal is Ce. In some embodiments the polyoxometalate is a heteropolyacid. The polymer electrolyte composition may be incorporated into a fuel cell polymer electrolyte membrane. The polymer electrolyte composition may be incorporated into a fuel cell membrane electrode assembly.

In another aspect, the present disclosure provides a polymer electrolyte which comprises first pendent groups which comprise a covalently bound polyoxometalate accompanied by a counterion to the polyoxometalate, wherein at least one of the polyoxometalate and the counterion comprise a transition metal selected from the group consisting of Mn and Ce. In some embodiments, the polyoxometalate comprises a transition metal selected from the group consisting of Mn and Ce. In some embodiments, the polyoxometalate comprises Mn. In some embodiments, the polyoxometalate comprises Ce. In some embodiments the counterion to the polyoxometalate is selected from the group consisting of Mn cations and Ce cations. In some embodiments the counterion to the polyoxometalate is Mn. In some embodiments the counterion to the polyoxometalate is Ce. In some embodiments the polymer electrolyte is fluorinated. In some embodiments the polymer electrolyte comprises a second acidic functional group other than a polyoxometalate. In some embodiments the polymer electrolyte comprises a second acidic functional group selected from the group consisting of phosphonic acids, sulfonic acids and bissulfonyl imides. In some embodiments the polyoxometalate is covalently bound to the polymer through a Ti or Zr atom. In some embodiments the polyoxometalate is covalently bound to the polymer through a silane group. In some embodiments the polyoxometalate is covalently bound to the polymer through a phosphonate group.

In another aspect, the present disclosure provides a fluorinated polymer electrolyte which comprises first pendent groups which comprise a covalently bound polyoxometalate.

In another aspect, the present disclosure provides a polymer electrolyte which comprises first pendent groups which comprise a covalently bound polyoxometalate and a second acidic functional group other than a polyoxometalate. In some embodiments, the second acidic functional group is selected from the group consisting of phosphonic acids, sulfonic acids and bissulfonyl imides.

In another aspect, the present disclosure provides a polymer electrolyte which comprises first pendent groups which comprise a covalently bound polyoxometalate wherein the polyoxometalate is covalently bound to the polymer through a Ti or Zr atom.

In another aspect, the present disclosure provides a polymer electrolyte which comprises first pendent groups which comprise a covalently bound polyoxometalate wherein the polyoxometalate is covalently bound to the polymer through a phosphonate group.

In another aspect, the present disclosure provides fuel cell polymer electrolyte membranes comprising each and every polymer electrolyte disclosed herein.

In another aspect, the present disclosure provides fuel cell membrane electrode assemblies comprising each and every polymer electrolyte disclosed herein.

In another aspect, the present disclosure provides a method of making a polymer electrolyte comprising a step of copolymerizing: a) a monomer comprising a covalently bound polyoxometalate which comprises a transition metal selected from the group consisting of Mn and Ce; with b) at least one comonomer.

In another aspect, the present disclosure provides a method of making a polymer electrolyte comprising the steps of: a) providing a polymer comprising three or more functional groups which may serve as binding sites for lacunary heteropolyacids; and b) covalently attaching a polyoxometalate to the polymer. In some embodiments, this method comprises the steps of: a) providing a polymer comprising three or more silane groups; and b) covalently attaching a polyoxometalate to a silane group of the polymer.

In another aspect, the present disclosure provides a method of making a polymer electrolyte comprising the steps of: a) providing a polymer comprising phosphonic acid groups; and b) covalently attaching a polyoxometalate to a phosphonic acid group of the polymer.

DETAILED DESCRIPTION

Figure 1:
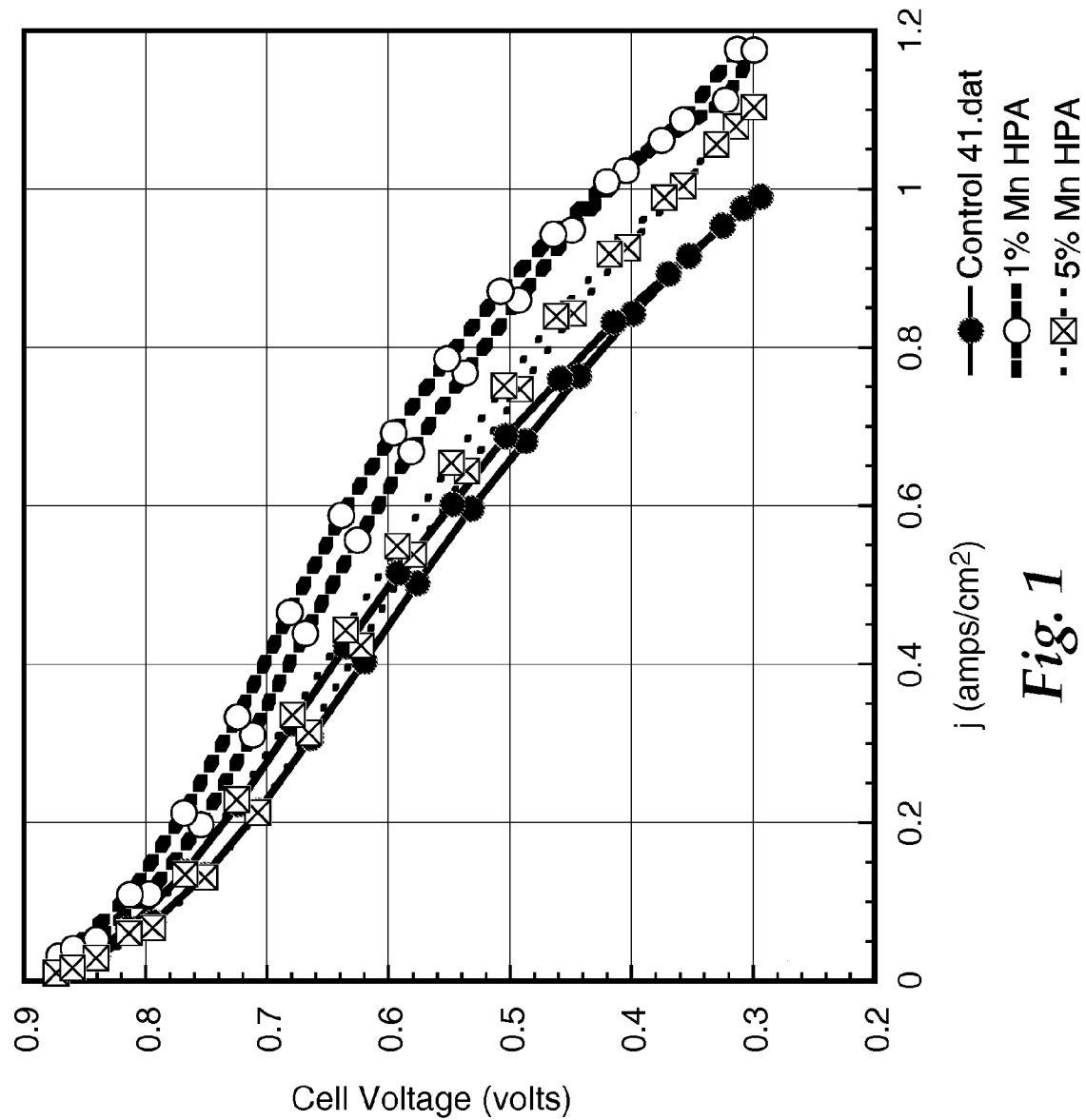
FIGS. 1 and 2 are graphs representing potentiostatic scans of MEA's according to the present invention and control MEA's, as described in Example 1.

The present disclosure concerns polymer electrolytes which comprise one or more polyoxometalates which may be accompanied by counterions, wherein one or both of the polyoxometalates or their counterions comprise transition metal atoms, which may include without limitation one or more of W, V, Mo, Nb, Mn and Ce, more typically Mn or Ce. The polyoxometalates may be isopolyoxometalates or heteropolyoxometalates. The polyoxometalates may be in acid form, i.e., charge balanced by protons ($H^+$), or may be in a salt form, i.e., charge balanced by cations other than protons ($H^+$). The polymer electrolyte containing polyoxometalates may comprise part or all of one or more parts of a fuel cell membrane electrode assembly, such as the polymer electrolyte membrane, the anode or the cathode. The polyoxometalates optionally may be partly or completely immobilized in the polymer electrolyte in any suitable manner, which may include precipitation as an insoluble salt, entrapment in a matrix, covalent attachment to a support, or covalent attachment to the polymer electrolyte itself.

Membrane electrode assemblies (MEA's) and polymer electrolyte membranes (PEM's) according to the present disclosure may be used in fuel cells. An MEA is the central element of a proton exchange membrane fuel cell, such as a hydrogen fuel cell. Fuel cells are electrochemical cells which produce usable electricity by the catalyzed combination of a fuel such as hydrogen and an oxidant such as oxygen. Typical MEA's comprise a polymer electrolyte membrane (PEM) (also known as an ion conductive membrane (ICM)), which functions as a solid electrolyte. One face of the PEM is in contact with an anode electrode layer and the opposite face is in contact with a cathode electrode layer. In typical use, protons are formed at the anode via hydrogen oxidation and transported across the PEM to the cathode to react with oxygen, causing electrical current to flow in an external circuit connecting the electrodes. Each electrode layer includes electrochemical catalysts, typically including platinum metal. The PEM forms a durable, non-porous, electrically non-conductive mechanical barrier between the reactant gases, yet it also passes $H^+$ ions readily. Gas diffusion layers (GDL's) facilitate gas transport to and from the anode and cathode electrode materials and conduct electrical current. The GDL is both porous and electrically conductive, and is typically composed of carbon fibers. The GDL may also be called a fluid transport layer (FTL) or a diffuser/current collector (DCC). In some embodiments, the anode and cathode electrode layers are applied to GDL's and the resulting catalyst-coated GDL's sandwiched with a PEM to form a five-layer MEA. The five layers of a five-layer MEA are, in order: anode GDL, anode electrode layer, PEM, cathode electrode layer, and cathode GDL. In other embodiments, the anode and cathode electrode layers are applied to either side of the PEM, and the resulting catalyst-coated membrane (CCM) is sandwiched between two GDL's to form a five-layer MEA.

The PEM according to the present disclosure may comprise any suitable polymer or blend of polymers. Typical polymer electrolytes bear anionic functional groups bound to a common backbone, which are typically sulfonic acid groups but may also include carboxylic acid groups, imide groups, amide groups, or other acidic functional groups. Polymer electrolytes according to the present disclosure may comprise functional groups which include polyoxometalates. The polymer electrolytes are typically fluorinated, more typically highly fluorinated and most typically perfluorinated but may also be non-fluorinated. The polymer electrolytes are typically copolymers of tetrafluoroethylene and one or more fluorinated, acid-functional comonomers. Typical polymer electrolytes include Nafion® (DuPont Chemicals, Wilmington Del.) and Flemion™ (Asahi Glass Co. Ltd., Tokyo, Japan). The polymer electrolyte may be a copolymer of tetrafluoroethylene (TFE) and $FSO_2-CF_2CF_2CF_2CF_2-O-CF=CF_2$, described in U.S. patent application Ser. Nos. 10/322,254, 10/322,226 and 10/325,278, which are incorporated herein by reference. The polymer typically has an equivalent weight (EW) of 1200 or less, more typically 1100 or less, more typically 1000 or less, more typically 900 or less, and more typically 800 or less. Non-fluorinated polymers may include without limitation sulfonated PEEK, sulfonated polysulfone, aromatic polymers containing sulfonic acid groups, and the like.

The polymer can be formed into a membrane by any suitable method. The polymer is typically cast from a suspension. Any suitable casting method may be used, including bar coating, spray coating, slit coating, brush coating, and the like. Alternately, the membrane may be formed from neat polymer in a melt process such as extrusion. After forming, the membrane may be annealed, typically at a temperature of 120° C. or higher, more typically 130° C. or higher, most typically 150° C. or higher. The PEM typically has a thickness of less than 50 microns, more typically less than 40 microns, more typically less than 30 microns, and most typically about 25 microns.

The polymer electrolyte according to the present disclosure may comprise polyoxometalates (POM's) or heteropolyacids (HPA's). Polyoxometalates are a class of chemical species that comprise oxygen-coordinated transition metal cations (metal oxide polyhedra), assembled into well-defined (discrete) clusters, chains, or sheets, wherein at least one oxygen atom coordinates two of the metal atoms (bridging oxygen). A polyoxometalate must contain more than one metal cation in its structure, which may be the same or different elements. Polyoxometalate clusters, chains, or sheets, as discrete chemical entities, typically bear a net electrical charge and can exist as solids or in solution with appropriately charged counterions. Anionic polyoxometalates are charge-balanced in solution or in solid form by positively charged counterions (countercations). Polyoxometalates that contain only one metallic element are called isopolyoxometalates. Polyoxometalates that contain more than one metal element are called heteropolyoxometalates. Optionally, polyoxometalates may additionally comprise a group 13, 14, or 15 metal cation. Anionic polyoxometalates that include a group 13, 14, or 15 metal cation (heteroatom), and that are charge-balanced by protons, are referred to as heteropolyacids (HPA). Heteropolyacids where the protons have been ion-exchanged by other countercations are referred as HPA salts or salts of HPA's.

In some embodiments of the present disclosure polymer electrolytes are provided which incorporate polyoxometalates. The polyoxometalates and/or their counterions comprise transition metal atoms, which may include without limitation one or more of W, V, Mo, Nb, Mn and Ce, more typically Mn or Ce. Some embodiments of the present disclosure concern polymer electrolytes which include manganese-containing polyoxometalates. Some embodiments of the present disclosure concern polymer electrolytes which include manganese salts of polyoxometalates. Some embodiments of the present disclosure concern polymer electrolytes which include cerium-containing polyoxometalates. Some embodiments of the present disclosure concern polymer electrolytes which include cerium salts of polyoxometalates. These categories are not mutually exclusive and may overlap, e.g., in manganese salts of manganese-containing polyoxometalates or of cerium-containing polyoxometalates or in cerium salts of manganese-containing polyoxometalates or of cerium-containing polyoxometalates.

Polyoxometalates that are useful in the present disclosure include isopolyoxometalates and heteropolyoxometalates. Polyoxometalates that are useful in MEA's may be water soluble or water insoluble. Water insoluble polyoxometalates may be less likely to be transported by water out of the MEA, and therefore polyoxometalates may be immobilized by precipitation in salt form, e.g., as a cesium salt.

HPA's and manganese or cerium salts of HPA's may be used in the practice of this disclosure. The useful heteropolyacids may comprise a manganese ion or a cerium ion in the polyoxometalate (e.g., cluster, chain, or sheet). Some embodiments of the present disclosure concern polymer electrolytes which include manganese-containing HPA. Some embodiments of the present disclosure concern polymer electrolytes which include manganese salts of HPA. Some embodiments of the present disclosure concern polymer electrolytes which include cerium-containing HPA. Some embodiments of the present disclosure concern polymer electrolytes which include cerium salts of HPA. These categories are not mutually exclusive and may overlap, e.g., in manganese salts of manganese-containing HPA's or of cerium-containing HPA's or in cerium salts of manganese-containing HPA's or of cerium-containing HPA's.

The polyoxometalates optionally may be partly or completely immobilized in the polymer electrolyte in any suitable manner, which may include precipitation as an insoluble salt, entrapment in a matrix (e.g., sol-gel metal oxide matrix), covalent attachment to a support (e.g., attachment to a particle, using a lacunary binding site on the polyoxometalate), or covalent attachment to the polymer (e.g., using a lacunary binding site on the polyoxometalate).

In some embodiments of the present invention a lacunary heteropolyacid is covalently attached to a polymer by functional groups of the polymer which may serve as binding sites for lacunary heteropolyacids, which may include phosphonic acids, silanes including trihalo and trialkoxy silianes, and the like. In some embodiments, the POM may be bound to the polymer through a Ti or Zr atom which forms a part of the POM to a carbon atom which forms a part of the polymer, which may include Ti—O—C, Zr—O—C, Ti—C or Zr—C linkages. Optionally, the polymer may be cross-linked. In some embodiments, the polymer is a polymer electrolyte. In some embodiments, the polymer electrolyte comprises pendent groups which impart proton conductivity, such as acid groups and the like, in addition to the heteropolyacids bound to the polymer. In other embodiments, the bound heteropolyacids provide substantially all of the proton conductivity of the resulting polymer electrolyte. In some embodiments, the polymer is a matrix, into which the polymer electrolyte may be imbibed, pressed, suctioned, or otherwise incorporated. In some embodiments, the polymer comprises a particle which may be mixed with a polymer electrolyte.

In some embodiments of the present invention a lacunary heteropolyacid is incorporated into a polymer during polymerization. The heteropolyacid may be modified so as to react as a monomer during polymerization, e.g., by incorporation of a functional group containing a reactive double bond or similar polymerizable group. Optionally, the polymer may be cross-linked. In some embodiments, the polymer is a polymer electrolyte. In some embodiments, the polymer electrolyte comprises pendent groups which impart proton conductivity, such as acid groups and the like, in addition to the heteropolyacids bound to the polymer. In other embodiments, the bound heteropolyacids provide substantially all of the proton conductivity of the resulting polymer electrolyte. In some embodiments, the polymer is a matrix, into which the polymer electrolyte may be imbibed, pressed, suctioned, or otherwise incorporated. In some embodiments, the polymer comprises a particle which may be mixed with a polymer electrolyte.

In some embodiments of the present invention a lacunary heteropolyacid is covalently attached to a polymer by functional groups of the polymer, via linking groups attached to the lacunary heteropolyacids. Optionally, the polymer may be cross-linked. In some embodiments, the polymer is a polymer electrolyte. In some embodiments, the polymer electrolyte comprises pendent groups which impart proton conductivity, such as acid groups and the like, in addition to the heteropolyacids bound to the polymer. In other embodiments, the bound heteropolyacids provide substantially all of the proton conductivity of the resulting polymer electrolyte. In some embodiments, the polymer is a matrix, into which the polymer electrolyte may be imbibed, pressed, suctioned, or otherwise incorporated. In some embodiments, the polymer comprises a particle which may be mixed with a polymer electrolyte.

In some embodiments of the present disclosure, one or more POM's, HPA's or salts thereof are added to the polymer electrolyte prior to membrane formation. Typically the POM, HPA or salt is mixed well with the polymer electrolyte to achieve substantially uniform distribution. Mixing is achieved by any suitable method, including milling, kneading and the like, and may occur with or without the inclusion of a solvent. The amount added is typically between 0.01 and 5 weight percent based on the total weight of the final polymer electrolyte or PEM, more typically between 0.1 and 2 wt %, and more typically between 0.2 and 0.3 wt %.

Membranes or polymers according to the present disclosure may contain any suitable POM content. POM content of membranes or polymers is typically less than 75% by weight.

In some embodiments of the present disclosure, polymers as described herein may be blended with other polymers or other polymer electrolytes to modify characteristics such as strength, Theological properties, Tg, and the like. In some embodiments of the present disclosure, polymers as described herein may be imbibed into a porous matrix or support layer, which may be fluorinated or non-fluorinated and may in some embodiments be expanded PTFE.

To make an MEA or CCM, catalyst may be applied to a PEM by any suitable means, including both hand and machine methods, including hand brushing, notch bar coating, fluid bearing die coating, wire-wound rod coating, fluid bearing coating, slot-fed knife coating, three-roll coating, or decal transfer. Coating may be achieved in one application or in multiple applications.

Any suitable catalyst may be used in the practice of the present disclosure. Typically, carbon-supported catalyst particles are used. Typical carbon-supported catalyst particles are 50-90% carbon and 10-50% catalyst metal by weight, the catalyst metal typically comprising Pt for the cathode and Pt and Ru in a weight ratio of 2:1 for the anode. Typically, the catalyst is applied to the PEM or to the FTL in the form of a catalyst ink. Alternately, the catalyst ink may be applied to a transfer substrate, dried, and thereafter applied to the PEM or to the FTL as a decal. The catalyst ink typically comprises polymer electrolyte material, which may or may not be the same polymer electrolyte material which comprises the PEM. The catalyst ink typically comprises a dispersion of catalyst particles in a dispersion of the polymer electrolyte. The ink typically contains 5-30% solids (i.e. polymer and catalyst) and more typically 10-20% solids. The electrolyte dispersion is typically an aqueous dispersion, which may additionally contain alcohols and polyalcohols such a glycerin and ethylene glycol. The water, alcohol, and polyalcohol content may be adjusted to alter rheological properties of the ink. The ink typically contains 0-50% alcohol and 0-20% polyalcohol. In addition, the ink may contain 0-2% of a suitable dispersant. The ink is typically made by stirring with heat followed by dilution to a coatable consistency.

In some embodiments of the present disclosure, the electrode or the catalyst ink comprises a polymer electrolyte which may be a polymer electrolyte comprising POM's or HPA's, as described above for use in PEM's. In some embodiments, polymer electrolytes comprising POM's or HPA's, as described above, may be used in one or both electrodes of the MEA but not in the PEM of the MEA.

To make an MEA, GDL's may be applied to either side of a CCM by any suitable means. Any suitable GDL may be used. Typically the GDL is comprised of sheet material comprising carbon fibers. Typically the GDL is a carbon fiber construction selected from woven and non-woven carbon fiber constructions. Carbon fiber constructions which may be useful may include: Toray™ Carbon Paper, SpectraCarb™ Carbon Paper, AFN™ non-woven carbon cloth, Zoltek™ Carbon Cloth, and the like. The GDL may be coated or impregnated with various materials, including carbon particle coatings, hydrophilizing treatments, and hydrophobizing treatments such as coating with polytetrafluoroethylene (PTFE) or tetrafluoroethylene copolymers such as FEP.

In use, the MEA according to the present typically sandwiched between two rigid plates, known as distribution plates, also known as bipolar plates (BPP's) or monopolar plates. Like the GDL, the distribution plate must be electrically conductive. The distribution plate is typically made of a carbon composite, metal, or plated metal material. The distribution plate distributes reactant or product fluids to and from the MEA electrode surfaces, typically through one or more fluid-conducting channels engraved, milled, molded or stamped in the surface(s) facing the MEA(s). These channels are sometimes designated a flow field. The distribution plate may distribute fluids to and from two consecutive MEA's in a stack, with one face directing fuel to the anode of the first MEA while the other face directs oxidant to the cathode of the next MEA (and removes product water). A typical fuel cell stack comprises a number of MEA's stacked alternately with distribution plates.

This disclosure is useful in the manufacture and operation of fuel cells.

Objects and advantages of this disclosure are further illustrated by the following examples, but the particular materials and amounts thereof recited in these examples, as well as other conditions and details, should not be construed to unduly limit this disclosure. Various modifications and alterations of this disclosure will become apparent to those skilled in the art without departing from the scope and principles of this disclosure, and it should be understood that this disclosure is not to be unduly limited to the illustrative embodiments set forth herein.

EXAMPLES

Unless otherwise noted, all reagents were obtained or are available from Aldrich Chemical Co., Milwaukee, Wis., or may be synthesized by known methods.

Example I

Purpose: The purpose of this study was to evaluate the use of a new Mn based HPA (Dawson type $H_7[P_2W_{17}O_{61}](Mn-OH_2)]-NH_2$) for FER (fluoride emission rate) reduction and increase conductivity under hotter drier conditions. The amount of PEM available limited the testing to one MEA for each different PEM type.

Method: PEMS were made at CSM using 3M 1000 ew ionomer (described in U.S. patent application Ser. Nos. 10/322,254, 10/322,226 and 10/325,278, which are incorporated herein by reference) with the additive being added to the solution in a weight percentage. The PEMS were cast and annealed at CSM. The nominal thickness of cast PEM was 1.6 mils, however each PEM used varied in thickness across the active area by 1.3 to 1.7 mils. Additive PEMS had color gradients and all PEM's had some morphological features and wrinkles. Best efforts were made to pick the best region possible. The electrodes used were 0.4 mg/cm$^2$ Pt machine coated 2950 GDL with standard EW ionomer and I/C ratio.

Fuel cell MEA's having 50 cm$^2$ of active area were prepared from PEM's as follows. Catalyst dispersions were coated onto PTFE-treated carbon paper gas diffusion layers and the resulting CCB's were applied to the PEM by pressing in a Carver Press (Fred Carver Co., Wabash, Ind.) with approximately 13.4 kN of force at approximately 132° C. for approximately 10 minutes.

All MEA's were tested in a test station with independent controls of gas flow, pressure, relative humidity, and current or voltage (Fuel Cell Technologies, Albuquerque, N. Mex.), in co-flow mode using Fuel Cell Technologies 50 cm$^2$ cells with a quad serpentine flow fields. There were four different stages to the fuel cell testing—incubation, temperature challenge, and aging for fluoride collection. Care was taken to avoid conditions where liquid water could form in the cell. At all times during the testing the inlet gasses were subsaturated and only during the highest currents in the incubation stage could the exit gas streams reach saturation. The cell was brought to operating temperature before gasses were saturated. The test station humidification system was modified to insure complete vaporization of the inlet gas streams. This was accomplished by metering the 18MΩ DI water using an HPLC pump with the water being pumped into a former sparge bottle filled with 916 SS wool along with the inlet gas. The bottle was heated to 10° C. above the dewpoint setpoint and the humidified gas steam exited the top of the bottle precluding any chance of liquid water leaving the bottle. Effluent water was collected from both the anode and the cathode outlet steams recording both time of collections and the mass of water collected. Water samples where later analyzed for F-concentration using a Dionex Ion Chromatography setup. For all testing the outlet gas steams were at ambient pressure.

Cell incubation was carried out at 80° C. cell temperature with $H_2$/air flows of 800/1800 sccm and with 70° C. inlet gas streams. Polarization scans were taken every ten minutes with the cell sitting at 0.5 volts between scans. Polarization scans were taken by changing the cell potential from 0.9 to 0.3 volts and back in 50 mV steps and 10 second dwell times while recording the current. The incubation period lasted for approximately six hours, always a sufficient time to reach a stable level of performance.

After incubation the testing script took the cell to the challenge phase of testing. The flows were set to 348 and 833 sccm, hydrogen and air respectfully. That equates to a stoichiometry of 2/2 at the 0.5 amps/cm² setpoint. The cell was first heated to 85° C. For the rest of the challenge phase only the cell temperature was varied from 85 to 100° C. in 3° C. intervals. At each temperature the cell was held at condition and current for twenty minutes before the final voltage was recorded in another ten minute scan. In that last ten minute scan, full spectrum impedance measurements were taken three to four times during the last scan. The impedance measurement was carried out under load and made use of a square wave of potential >10 mV that was sent across the cell and a known shut resistor in the circuit. Fast Fourier transforms were used to derive the impedance as a function of frequency.

The last stage in the testing was the aging step that would loop until the operator shutdown the cell. It was during this phase of the testing that the effluent water collections were made. At least eight pairs of collections were made unless the cell was not holding current or the OCV was dropping precipitously. For the aging step the cell temperature was held at 90° C. with the hydrogen/air flows at 348/833 sccm and the inlet gas steams held at 70° C. dewpoints. The cell cycle between 30 minutes at 0.5 amps/cm² and then a 2 minute measurement was taken at OCV before returning to the constant 0.5 amps/cm² scanning.

ECSA (Electrochemical Surface Area) testing carried out post-mortem for all samples tested at a super saturated 40/60/60° C., $H_2/N_2$ 800/1800 sccm, ambient outlets, test condition. This condition was chosen to exacerbate any HPA loss. Three different voltage sweeps were made—50 mV/sec 0.11-0.65 volts, 2 mV/sec 0.11-0.65 volts, and 50 mV/sec 0.11-1.1 volts. The second is used to determine the baseline while the first is referred to as the "normal" scan and the last as the "extended". If a cathode were poisoned by something that is oxidizable then the extended would show an increase in surface area compared to the normal.

Figure 2:
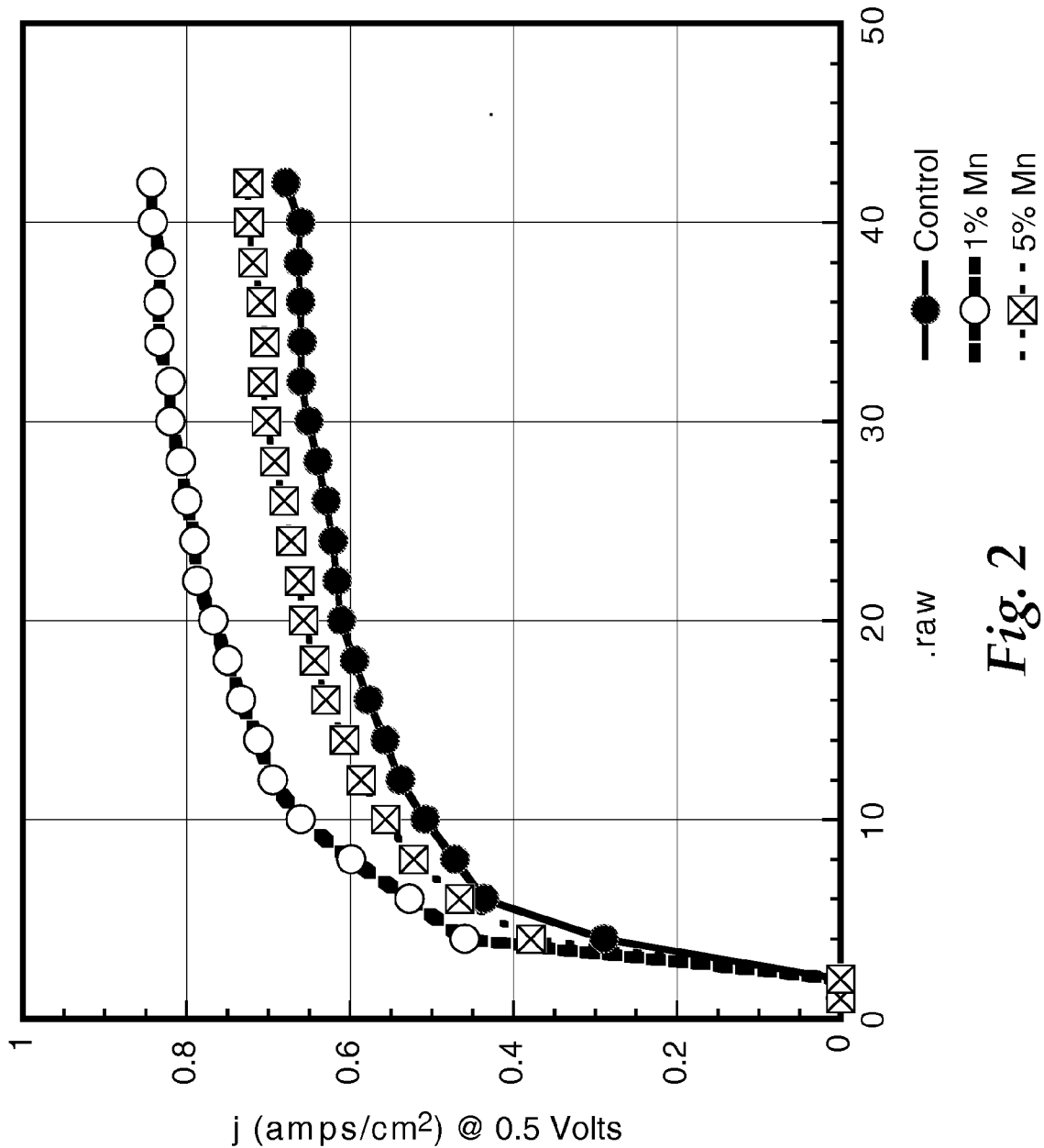

Results:
Startup—
FIGS. 1 and 2 show the startup phase. FIG. 1 depicts the last polarization scan taken under the startup conditions. FIG. 2 shows of PSS (potentiostatic scans) taken between polarization scans as a function of scan number. The approximate time for startup running is six hours.

Figure 3:
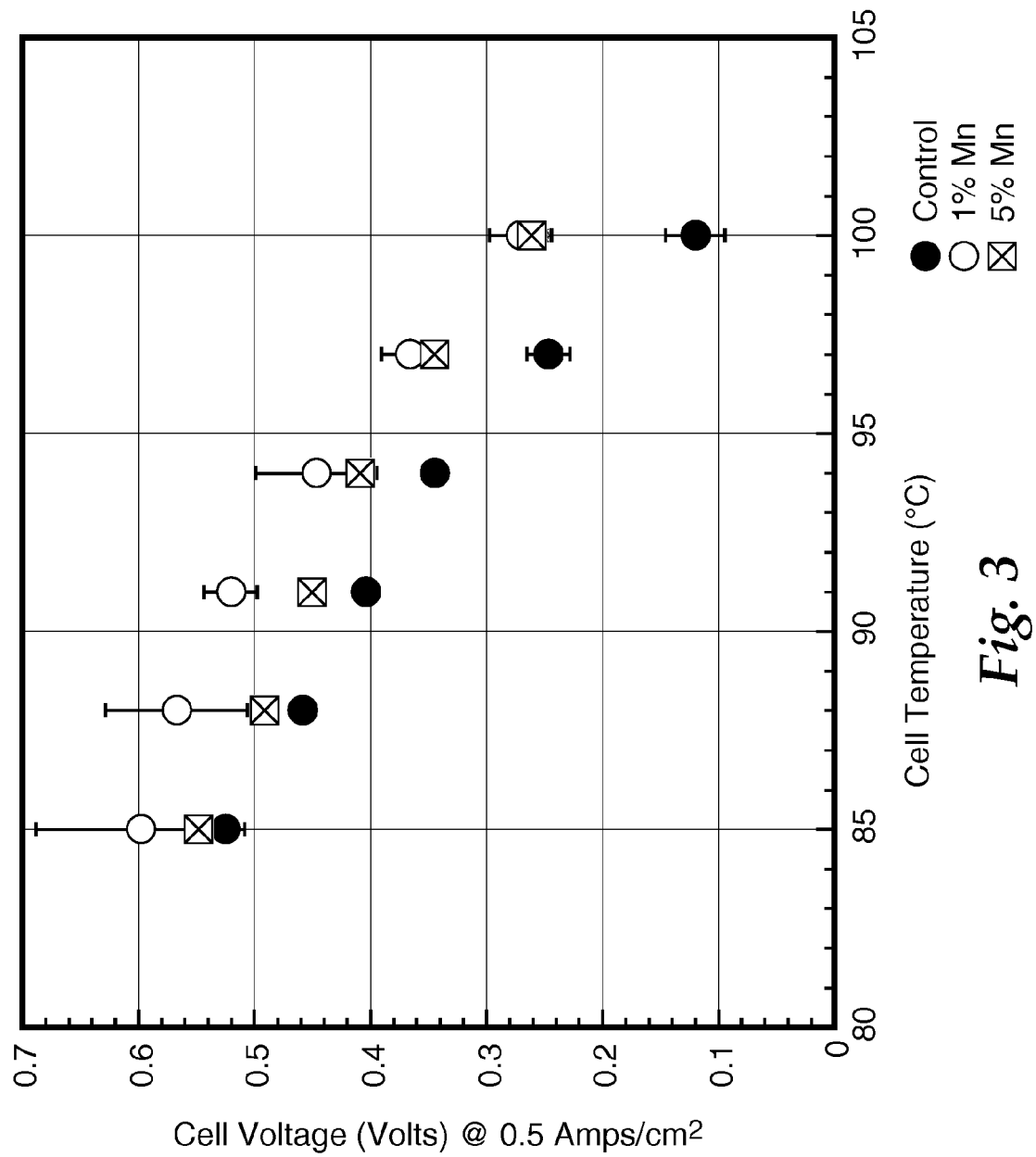
FIG. 3 is a graph representing the performance of MEA's according to the present invention and control MEA's as a function of cell temperature with a fixed dewpoint, as described in Example 1.
Figure 4:
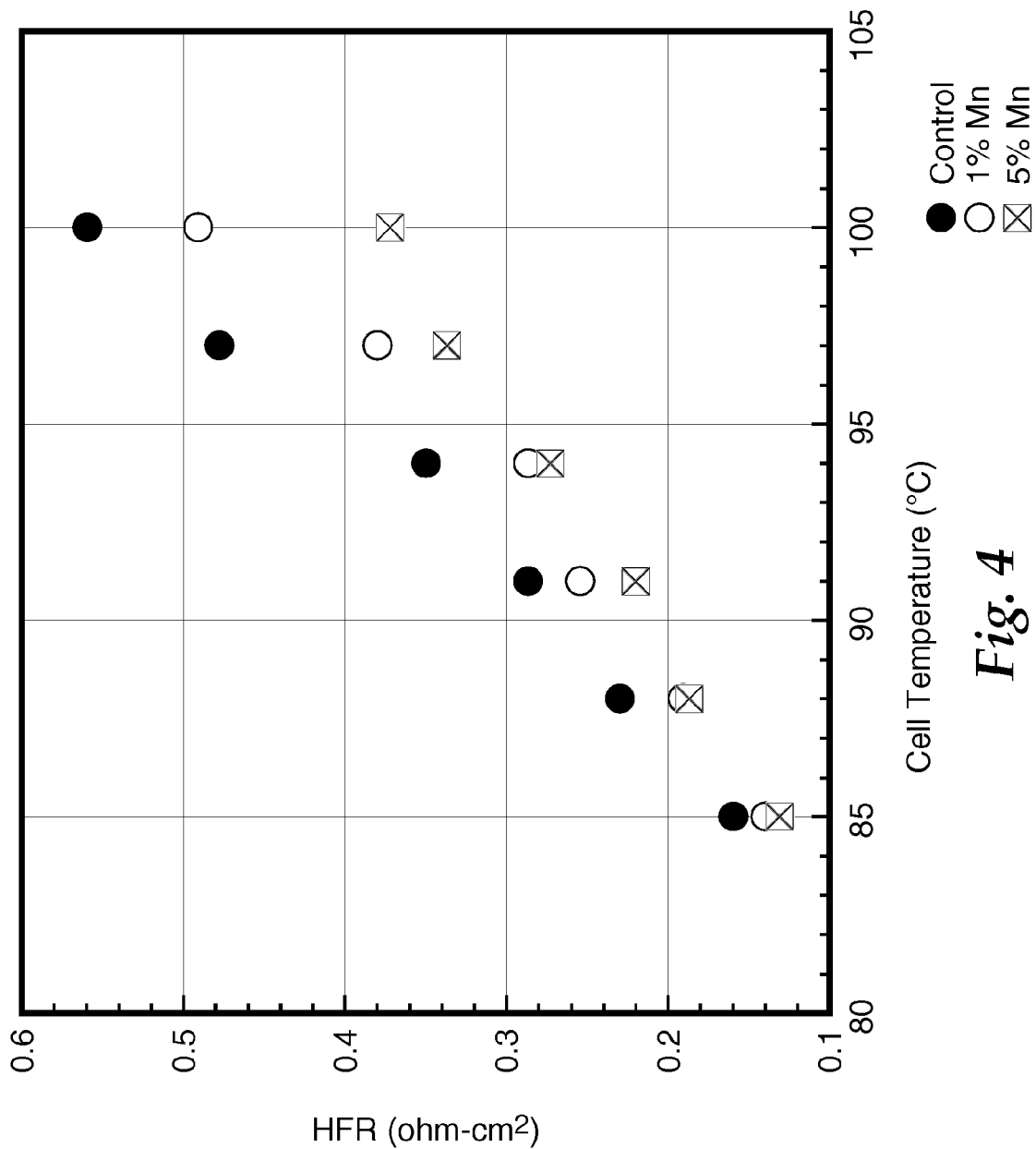
FIG. 4 is a graph representing HFR (high frequency resistance) of MEA's according to the present invention and control MEA's as a function of cell temperature, as described in Example 1.
Figure 8:
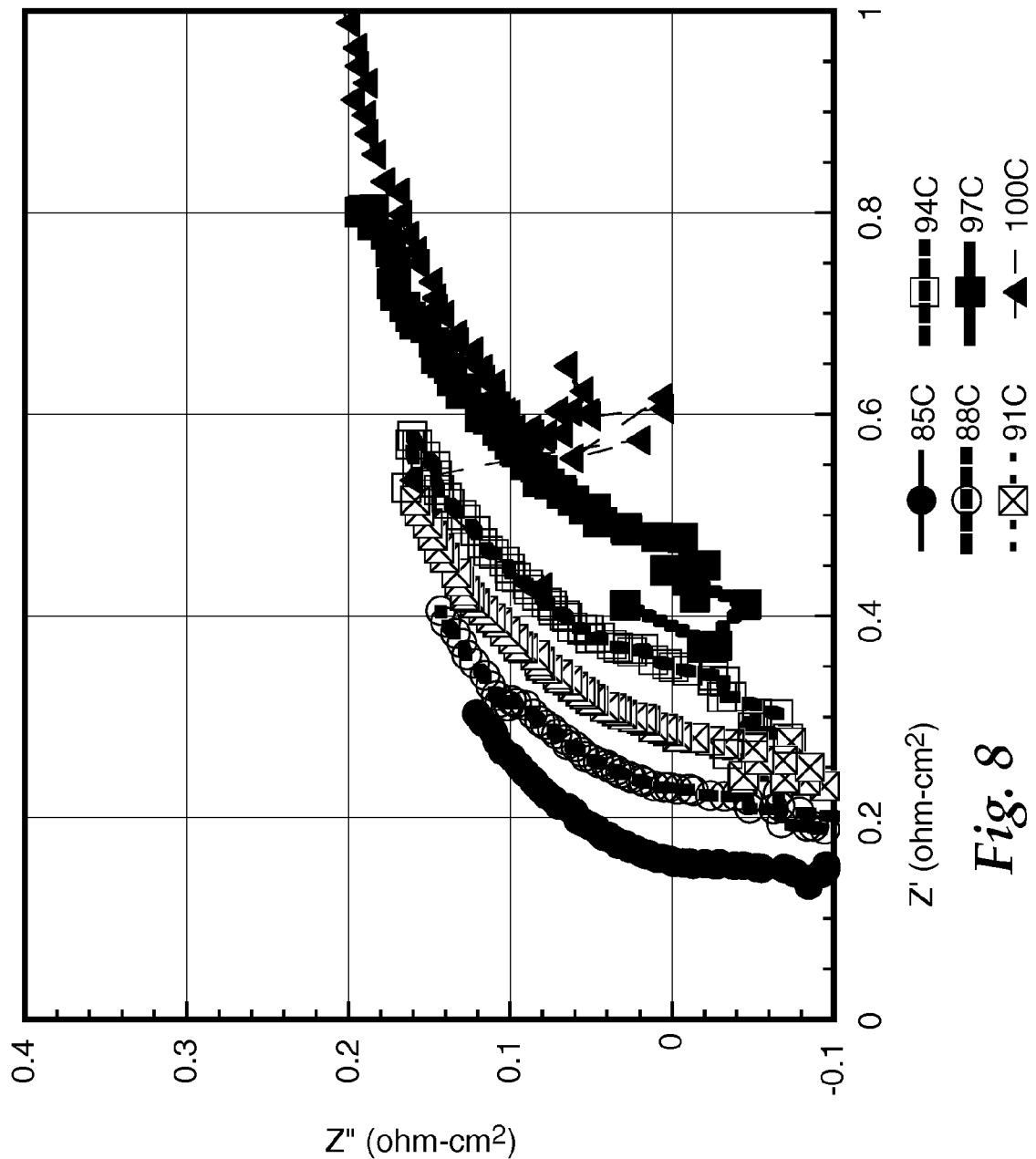
FIGS. 8-10 are graphs of the Cole-Cole plot full spectrum of impedance for a variety of samples and temperatures, as described in Example 1.
Figure 9:
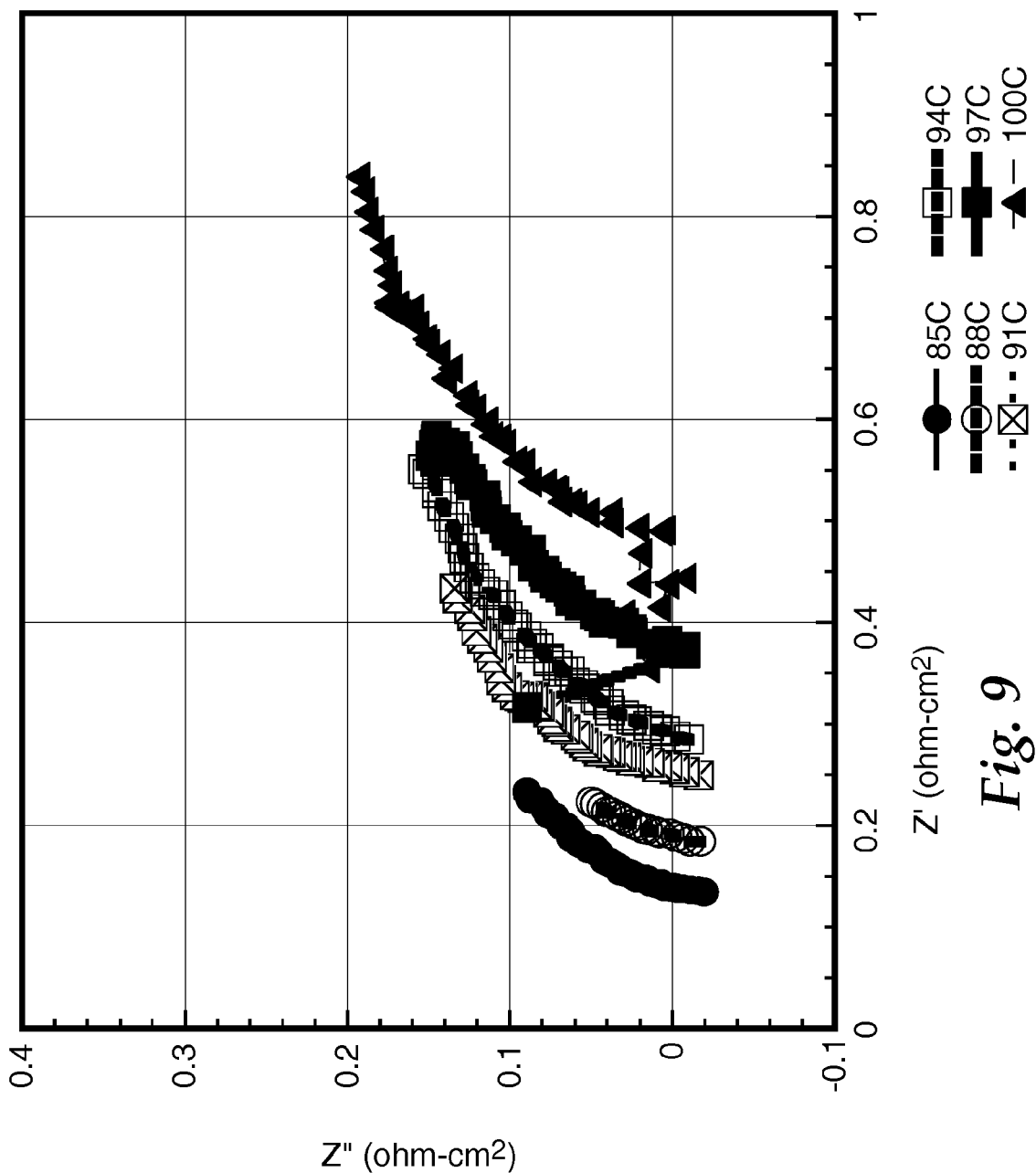
Figure 10:
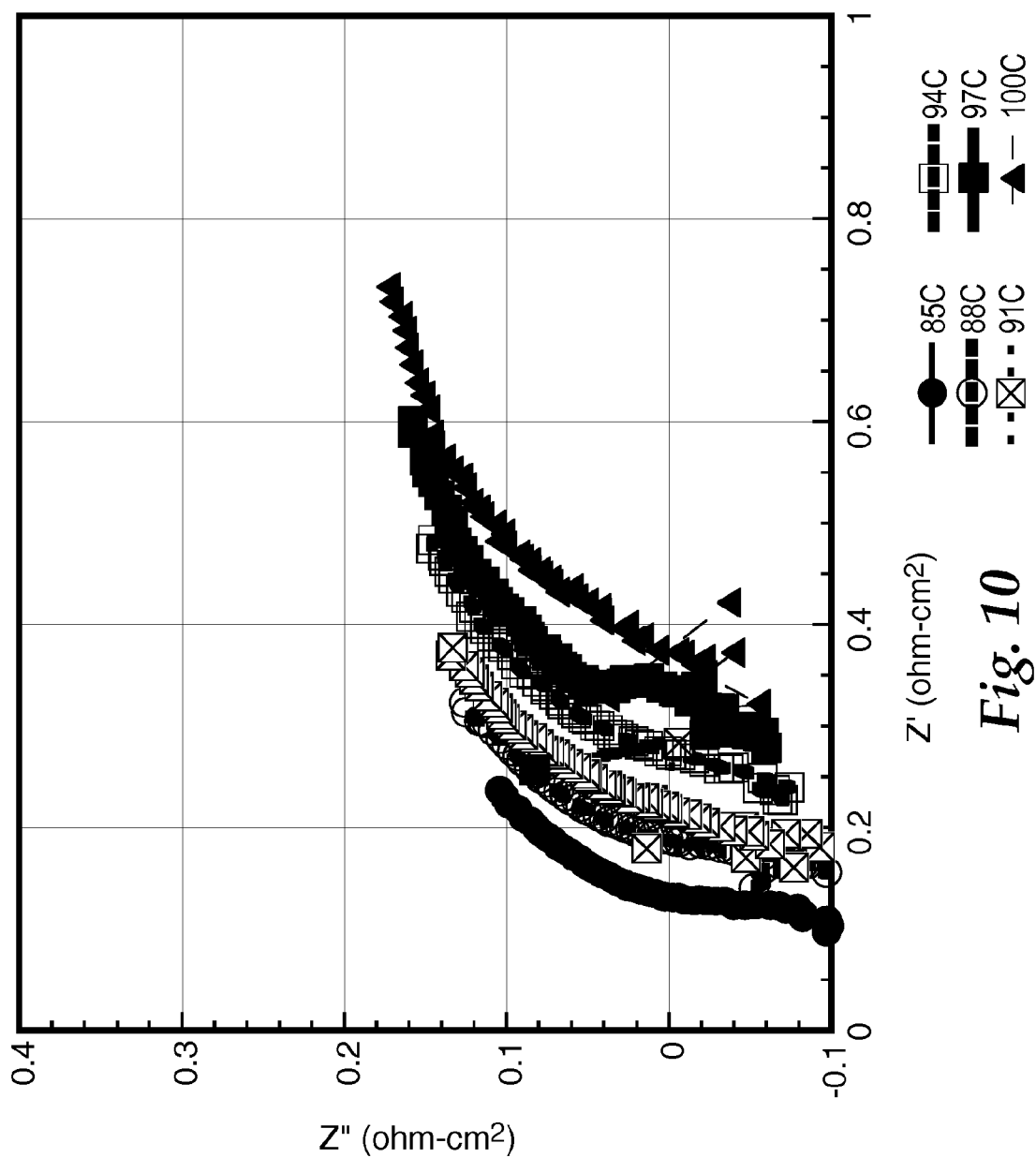

Dry Challenge Testing—
After startup the script moves into the dry challenge testing. The results can be seen in FIGS. 3 and 4. FIG. 3 shows the performance of each MEA as a function of cell temperature with a fixed dewpoint. The error bar is the voltage variance over the last GSS (galvanostatic scan). FIG. 4 shows the HFR (high frequency resistance) as a function of cell temperature. The Cole-Cole plot full spectrum of the impedance for each temperature and sample is plotted isotropically in FIGS. 8-10.

Figure 5:
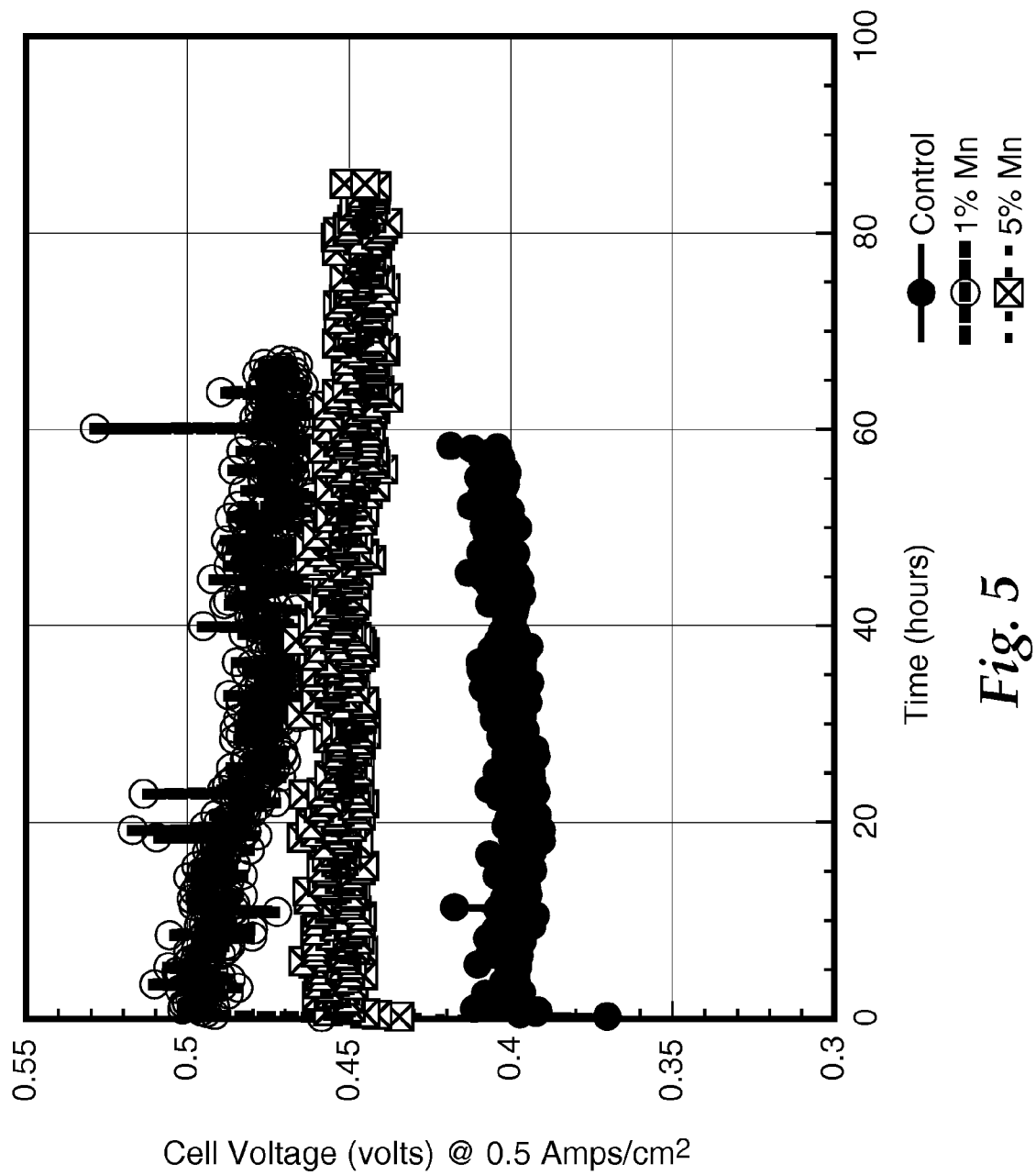
FIG. 5 is a graph representing the performance of MEA's according to the present invention and control MEA's as voltage under load over time, as described in Example 1.
Figure 6:
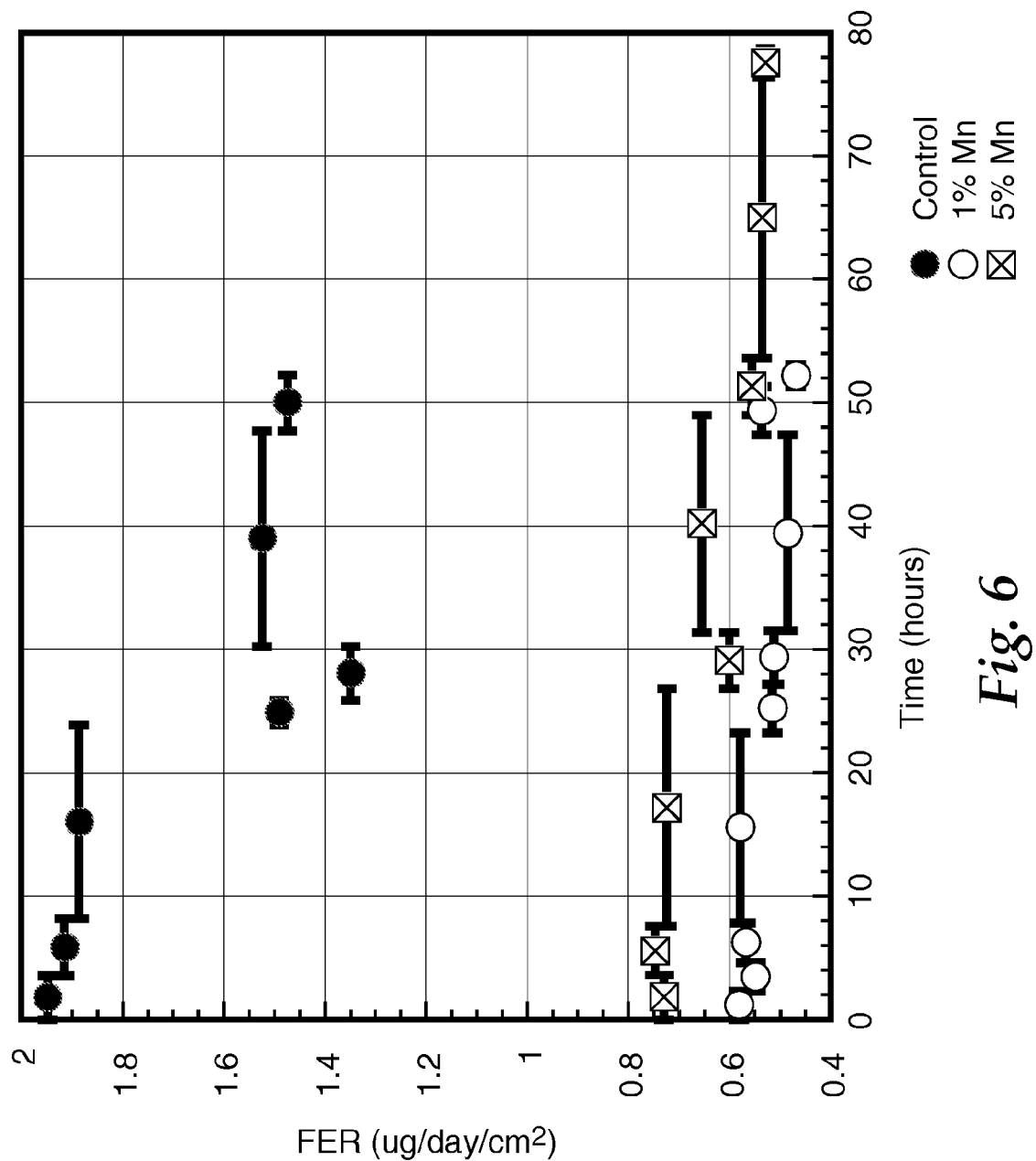
FIG. 6 is a graph representing FER vs. time for MEA's according to the present invention and control MEA's, as described in Example 1.

Accelerated Testing—
The accelerated testing results are depicted in FIG. 5, which represents voltage under load vs. time, and FIG. 6, which represents FER vs. time. In FIG. 6, the x bar represents the time of collection.

Figure 7:
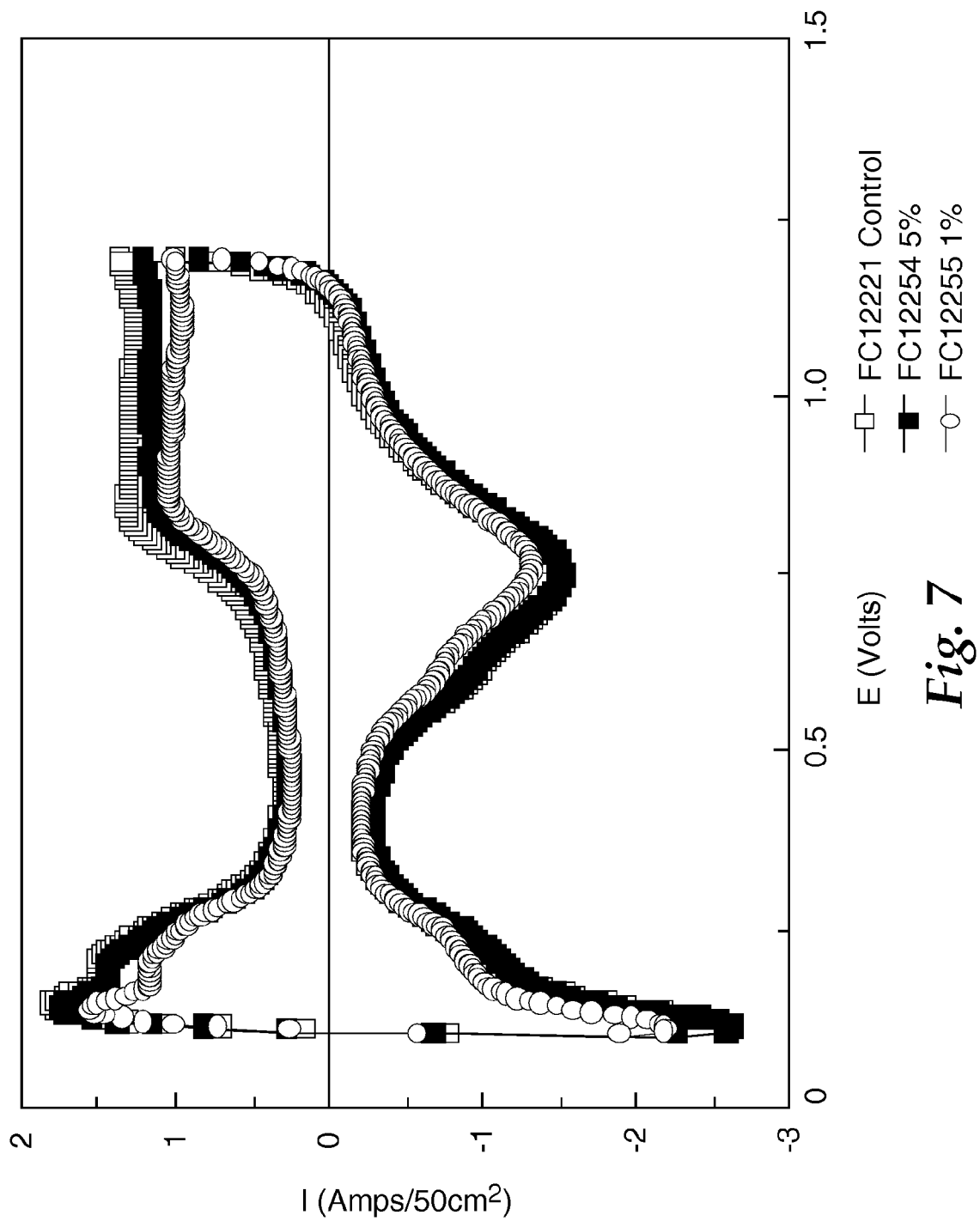
FIG. 7 is a graph representing extended spectra for MEA's according to the present invention and control MEA's, as described in Example 1.

ECSA Testing—
The results of the ECSA testing are highlighted in Table 1. The 1% Mn seemed to have the only real difference in SEF (surface enhancement factor—catalyst surface area/geometric surface area). It may well be that this was taken from a poorer portion of the roll. Looking at the extended spectra in FIG. 7 there is no clearly observable feature associated with the Mn and all the spectra look roughly equal.

TABLE 1

| Sample | Scan | SEF (cm²/cm²) | Crossover (mA/cm²) | Short (ohm-cm²) | DL (a.u.) |
|---|---|---|---|---|---|
| control | Normal | 186 | 0.7 | 414 | 0.0089 |
| control | Extended | 172 | 0.7 | 414 | 0.012 |
| 1% | Normal | 152 | 0.5 | 450 | 0.0082 |
| 1% | Extended | 147 | 0.5 | 745 | 0.0098 |
| 5% | Normal | 179 | 0.4 | 1100 | 0.0094 |
| 5% | Extended | 175 | 0.4 | 1100 | 0.012 |

Additional Tests—
5 cm² pieces of PEM were die cut out weighed then put in a sealed bottle with 20 ccs of DI water at room temperature. There was no measurable difference in pH between the samples as tested using pH strips.

Conclusion: This additive is unique, showing lower HFR in drier conditions, lower FER, and high stability.

Example II

1. Preparation of Lacunary Heteropoly Acids

Potassium salts of mono-vacant and di-vacant lacunary silicotungstic acid have been synthesized as described in Teze, A.; Herve, G., α-, β-, and γ-Dodecatungstosilicic acids: isomers and related lacunary compounds. *Inorganic Syntheses* 1990, 27, 85-96, the disclosure of which article is incorporated herein by reference. Any lacunary heteropoly acid could potentially be used in the synthesis of hybrid organic-inorganic monomers. The potassium salt of lacunary silicotungstic acid has been used as prepared.

Often, we would like to start out with the acid form of the lacunary silicotungstic acid for these syntheses. The acid form is prepared from the potassium salt by an ether extraction method modified by procedures described in Cowan, J. J.; Hill, C. L.; Reiner, R. S.; Weinstock, I. A., Dodecatungstoalumic acid and its lacunary and mixed addendum derivatives. *Inorganic Syntheses* 1990, 33, 18-26, the disclosure of which article is incorporated herein by reference. A 0.085 M solution of the potassium salt of lacunary silicotungstic acid is prepared in D.I. water with stirring and heating to 60° C. The solution is carefully cooled to 35(±3)° C. In an ice bath, concentrated sulfuric acid is added drop by drop to the solution while maintaining the temperature of the solution to 35(+3)° C. Concentrated sulfuric acid is added until the ratio of water added to sulfuric acid added is 3:1. After the addition of sulfuric acid, the solution is allowed to cool in the ice bath until the temperature reaches 0° C. As the solution cools, a white precipitate should form at about 5° C. The solution is transferred to a separatory funnel and chilled diethyl ether at 0° C. is added. The ether-water ratio in the separatory funnel should be about 1:1. The separatory funnel is shaken and carefully vented. After settling, an etherate layer is formed at the bottom of the funnel and removed. The funnel is shaken and vented repeatedly until the etherate layer no longer forms. Ether is added to the funnel during this process to replace any lost through venting. The etherate fraction is allowed to evaporate in the hood to form the desired product.

2. Preparation of Functionalized Organic Derivatives

Any number of functionalized silanes or phosphoryl derivatives may be attached to the lacunary heteropoly acid to form an inorganic-organic hybrid monomer. The functionalized organic precursors used in this project were methacryl and styryl silanes. Methacryloxypropyltrimethoxysilane was purchased form Gelest, Inc. Triethoxystyryl-silane was prepared by a Gringard reaction as described in Judeinstein, P., Synthesis and Properties of Polyoxometalates Based Inorganic-Organic Polymers. *Chem. Mater.* 1992, 4, 4-7, the disclosure of which article is incorporated herein by reference. There are a number of other functionalized organic compounds that could also be incorporated into these monomers.

3. Preparation of Inorganic-Organic Hybrid Monomers

The potassium salt or the acid form of mono- or di-vacant lacunary silicotungstic acid is mixed with an organophosphoryl or an organosilyl functionalized compound (phenyl-phosphonic acid, phosphonic acid, triethoxystyrylsilane, or methacryloxypropyl-trimethoxysilane, etc.) in an aqueous solution or in a mixture of water and acetonitrile. The mixture is acidified by adding hydrochloric acid if necessary. This mixture is allowed to react with stirring at room temperature or at reflux temperature overnight. The tetrabutyl- or tetramethyl-ammonium (TBA or TMA) salt can be obtained by adding a stoichiometric amount of tetrabutylammonium bromide or tetramethylammonium chloride respectively. The white precipitate formed is washed with water and isopropyl alcohol. The potassium salt or the acid form of the monomer can be obtained by rotovapping the solution to obtain the desired product. A typical reaction equation is shown below:

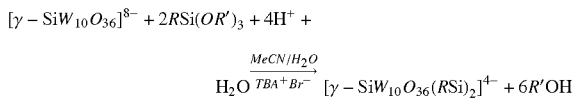

A large variety of inorganic-organic hybrid monomers have been prepared in this way, depending on the HPA used, the organic component, and the stoichiometric amounts of each component present. Table 2 summarizes the types of monomers prepared.

TABLE 2

Synthesized Monomers

| Name | Formula | Shortcut Name |
|---|---|---|
| Bis(methacrylsilyl)dodecatungstosilicate TMA salt | $[((CH_3)_4N^+)_4][\alpha SiW_{11}O_{39}{}^{4-}]O[Si(CH_2)_3OC(O)CCH_3CH_2]_2$ | TMASiW11(methacryl)2 |
| Bis(methacrylsilyl)decatungstosilicate TMA salt | $[((CH_3)_4N^+)_3H^+][\alpha SiW_{10}O_{36}{}^{4-}]O[Si(CH_2)_3OC(O)CCH_3CH_2]_2$ | TMASiW10(methacryl)2 |
| Bis(methacrylsilyl)dodecatungstosilicate - TBA Salt | $[((C_4H_9)_4N^+)_4][\gamma SiW_{11}O_{39}{}^{4-}]O[Si(CH_2)_3OC(O)CCH_3CH_2]_2$ | TBASiW11(methacryl)2 |
| Bis(methacrylsilyl)decatungstosilicate - TBA Salt | $[((C_4H_9)_4N^+)_4][\gamma SiW_{10}O_{36}{}^{4-}]O[Si(CH_2)_3OC(O)CCH_3CH_2]_2$ | TBASiW10(methacryl)2 |
| Tetrakis(methacrylsilyl)dodecatungstosilicate-TBA salt | $[((C_4H_9)_4N^+)_4][\alpha SiW_{11}O_{39}{}^{4-}]O[Si(CH_2)_3OC(O)CCH_3CH_2]_4$ | TBASiW11(methacryl)4 |
| Tetrakis(methacrylsilyl)decatungstosilicate - TBA salt | $[((C_4H_9)_4N^+)_4][\gamma SiW_{10}O_{36}{}^{4-}]O[Si(CH_2)_3OC(O)CCH_3CH_2]_4$ | TBASiW10(methacryl)4 |
| Bis(methacrylsilyl)dodecatungstosilicate $K^+$ salt | $K_4{}^+[\alpha SiW_{11}O_{39}]O[Si(CH_2)_3OC(O)CCH_3CH_2]_2$ | KSiW11(methacryl)2 |
| Tetrakis(methacrylsilyl)decatungstosilicate - $Na^+$ salt | $Na_4{}^+[\gamma SiW_{10}O_{36}{}^{4-}]O[Si(CH_2)_3OC(O)CCH_3CH_2]_4$ | NaSiW10(methacryl)4 |
| Bis(methacrylsilyl)dodecatungstosilicate $H^+$ form | $H_4{}^+[\alpha SiW_{11}O_{39}]O[Si(CH_2)_3OC(O)CCH_3CH_2]_2$ | HSiW11(methacryl)2 |
| Tetrakis(methacrylsilyl)decatungstosilicate - $H^+$ form | $H_4{}^+[\gamma SiW_{10}O_{36}{}^{4-}]O[Si(CH_2)_3OC(O)CCH_3CH_2]_4$ | HSiW10(methacryl)4 |
| Bis(styrylsilyl)dodecatungstosilicate TBA salt | $[((C_4H_9)_4N^+)_4][\alpha SiW_{11}O_{39}{}^{4-}]O[SiC_6H_4CHCH_2]_2$ | TBASiW11(styryl)2 |
| Bis(styrylsilyl)dodecatungstosilicate $H^+$ form | $H_4{}^+[\alpha SiW_{11}O_{39}{}^{4-}]O[SiC_6H_4CHCH_2]_2$ | HSiW11(styryl)2 |
| Bis(phenylphosphoryl)-decatungstosilicate TBA salt | $[((C_4H_9)_4N^+)_4][\gamma SiW_{10}O_{36}{}^{4-}]C_6H_5PO]_2$ | TBASiW10(PhPO)2 |
| Bis(hydrophosphoryl)-decatungstosilicate TBA salt | $[((C_4H_9)_4N^+)_4][\gamma SiW_{10}O_{36}{}^{4-}]HPO]_2$ | TBASiW10(HPO)2 |

A specific example of this synthesis is the preparation of $HSiW_{11}(methacryl)_4$ monomer (sample JLH-14-9b). Acetonitrile (60.0 ml) and water (40.0 mL) is added to a beaker with stirring. Then 5.4851 g (2 mmol) of di-vacant lacunary silicotungstic acid potassium salt $[K_8(\gamma\text{-}SiW_{10}O_{36}).8H_2O]$ is added with stirring to form a white slurry. Then 1.9866 g (8 mmol) of methacryloxypropyltrimethoxysilane $[(CH_3O)_3Si(CH_2)_3OC(O)C(CH_3)CH_2]$ is added drop wise to the stirring slurry. Concentrated hydrochloric acid (8.0 mL) is slowly added to the slurry with stirring and the slurry clears. The beaker is covered and allowed to stir for 6 hours. The solution is then filtered and a small amount of a sticky co-product is obtained. The solution is rotovapped to remove the solvent and the solid obtained is washed with ethanol. After stirring the product in the ethanol wash solution, it is filtered. Evaporating the filtrate from ethanol wash solution, 3.8629 g of white solid product is obtained (62% yield).

4. Preparation of Inorganic-Organic Hybrid Polymers

Two general methods were used to prepare inorganic-organic hybrid polymers and co-polymers. These include solution radical polymerization, redox emulsion polymerization and a unique method for aqueous solution radical polymerization.

A specific example of this synthesis is the polymerization of $HSiW_{11}(styryl)_2$ polymer (sample JLH-12-195a). This polymer is made from 100% $HSiW_{11}(styryl)_2$ monomer so it is given the code PolyPOM100s. $HSiW_{11}(styryl)_2$ (0.6672 g) is added to a vial. Then dimethylsulfoxide (DMSO) (3-4 mL) is added slowly to dissolve the monomer. The solution is syringe filtered into a thick pyrex tube sealed at one end. The tube is placed in boiling water and the solution is degassed by bubbling argon gas through it for 30 minutes. Then the initiator azobisisobutrylnitrile (0.047 g, 8 wt % of initiator based on monomer functional groups) is added to the tube. The tube is placed in room temperature water and alternately purged with argon gas and then evacuated 5 times. The tube is then hermetically sealed using a burner and placed under a uv lamp. Polymerization occurred within 30 minutes. The tube was broken open and a white colored polymer gel was obtained.

Attempts were made to prepare more pliable membranes by co-polymerizing these monomers with more common commercial monomers which might affect the glass transition temperature, tg. Co-polymerization was carried out using methyl methacrylate, ethyl methacrylate, butyl acrylate and hexyl acrylate as the co-monomer. Other monomers could be used as well. These polymerizations were carried out as described above, but with the addition of one or more of the above co-monomers to the tube. Initiator amounts added were adjusted accordingly. A wide range of materials have been formed from gels to brittle membranes.

A specific example of the synthesis of a co-polymer is TBASiW$_{11}$(methacryl)$_2$/BA co-polymer (sample JLH-13-70a). This polymer is 93 wt % TBASiW$_{11}$(methacryl)$_2$ co-monomer and 7 wt % butyl acrylate co-monomer. It is given the code of PolyPOM93m. TBASiW$_{11}$(methacryl)$_2$ monomer (2.0236 g) was added to an empty vial. Then 0.1604 g of Butyl Acrylate (BA) is added to the vial. Dimethyl Formamide (DMF) (1.4459 g) is added to the vial to dissolve the monomers. The solution is filtered through a syringe filter into a glass tube sealed at one end. The glass tube is placed in boiling water and degassed by bubbling argon gas through it for 30 minutes. Benzoyl peroxide (BOP) (0.0156 g—5 wt % initiator based on monomer functional groups) is added to the tube. The tube is then alternately purged with argon gas and evacuated 5 times. It is then hermetically sealed using a burner. The tube was placed under uv light and within 30 minutes the liquid in the tube thickened considerably. The tube was broken open and the liquid was cast on a glass plate and spread to a thickness of 25 um using a membrane spreader. After the membrane dried on the glass plate at room temperature, it was annealed in an oven at 160° C. for 20 minutes. A yellow, brittle membrane was formed.

Table 3 summarizes the polymers and co-polymers synthesized by radical solution polymerization.

TABLE 3

| Polymer (shortcut name) | Wt % HPA Monomer | Solvent | Initiator |
|---|---|---|---|
| TMASiW11(methacryl)2 polymer | 100% | DMF | BOP |
| TMASiW10(methacryl)2 polymer | 100% | DMF | BOP |
| TBASiW11(methacryl)2 polymer | 100% | DMF | BOP |
| TMASiW11(methacryl)2/MMA co-polymer | 49%, 63%, 94% | DMF | BOP |
| TBASiW10(methacryl)2/MMA co-polymer | 76% | DMF | BOP |
| TBASiW11(methacryl)2/MMA co-polymer | 78% | DMF | BOP |
| TBASiW10(methacryl)4/MMA co-polymer | 78%, 46% | DMF | BOP |
| TBASiW11(methacryl)4/MMA co-polymer | 52%, 91% | DMF | BOP |
| TBASiW11(methacryl)4/BMA/MMA co-polymer | 48%, 45% | DMF | BOP |
| TBASiW10(methacryl)4/BMA/MMA co-polymer | 72% | DMF | BOP |
| HSiW11(styryl)2 polymer | 100% | DMF or DMSO or PC | BOP or ABIN |
| TBASiW11(styryl)2 polymer | 100% | DMSO or PC | ABIN or BOP |
| KSiW11(styryl)2 polymer | 100% | DMSO | BOP |
| HSiW11(methacryl)2/BMA/MMA copolymer | 48% | DMF | BOP |
| TBASiW10(methacryl)2/BMA co-polymer | 70% | DMF | BOP |
| TBASiW11(methacryl)2/BMA co-polymer | 71% | DMF | BOP |
| TBASiW11(methacryl)2/BA co-polymer | 92%, 93%, 79% | DMF | BOP |
| HSiW11(methacryl)2/HA co-polymer | 92% | DMF | BOP |
| TBASiW11(methacryl)2/HA co-polymer | 92% | DMF | BOP |
| HSiW11(methacryl)2/BA co-polymer | 79% | DMF | BOP |
| HSiW11(methacryl)2 | 100% | DMF | BOP |

Figure 11:
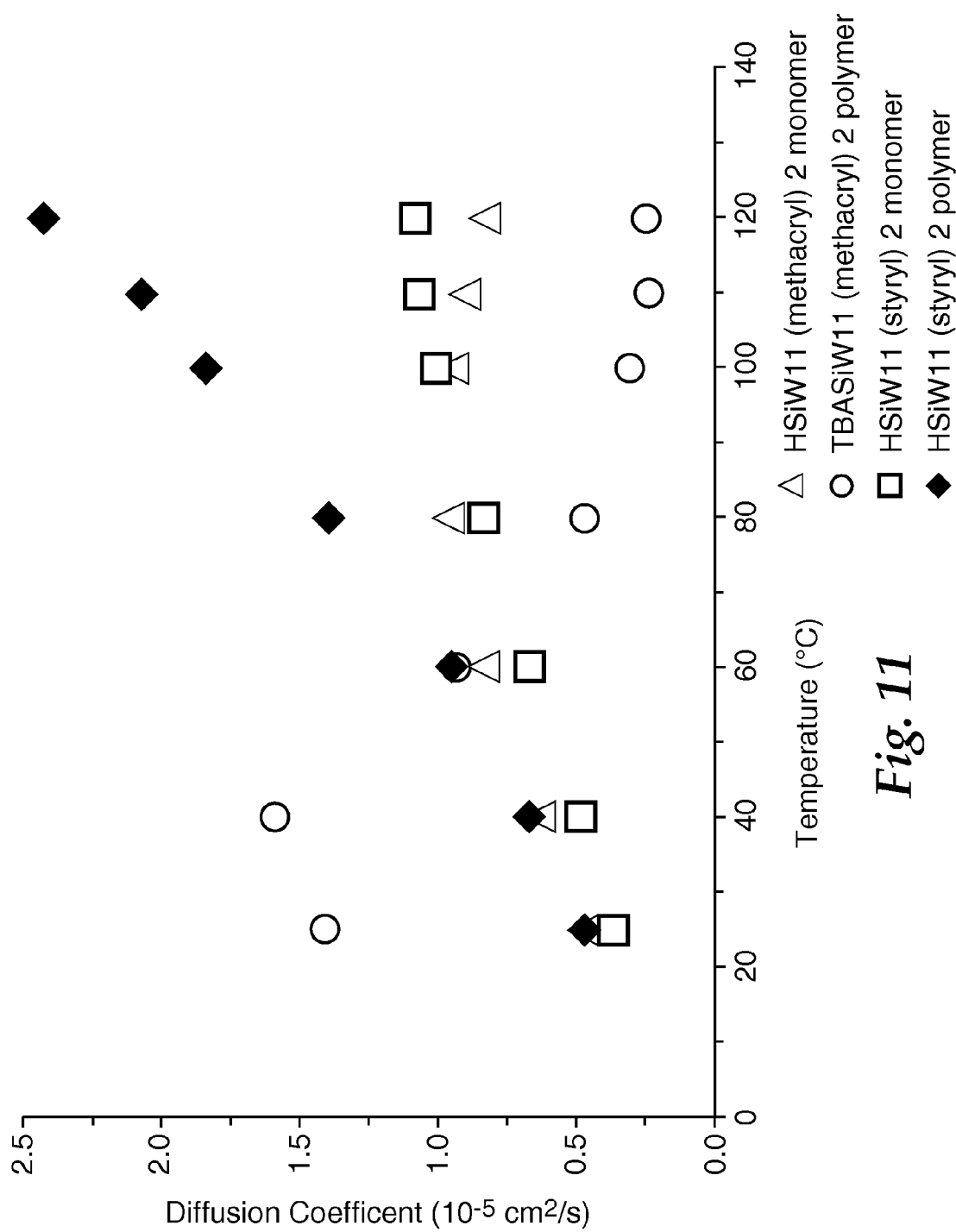
FIG. 11 is a graph of PFGSE NMR proton diffusion coefficients at various temperatures for hybrid inorganic-organic monomers and polymers, as described in Example 2.

Abbreviations: DMF—dimethylformamide, BOP—benzoyl peroxide, DMSO—dimethyl sulfoxide, ABIN—azobisisoburyrylnitrile, PC—propylenecarbonate PFGSE NMR measurements have been made on several of the polymer materials produced by radical polymerization techniques (See FIG. 11, which reports PFGSE NMR proton diffusion coefficients at various temperatures for hybrid inorganic-organic monomers and polymers). Proton diffusion in these materials is comparable to Nafion®.

A redox emulsion polymerization technique was used in an attempt to form hybrid polymers that were less brittle and more easily cast (or pressed) into a pliable membrane. Generally, the molecular weights of the polymers produced by an emulsion process tend to be greater than those produced by bulk polymerizations.

Commercial samples of butyl methacrylate (BM), butyl acrylate (BA) and ethyl acrylate (EA) were used as co-monomers. A mixture of water and a hybrid methacryl monomer was added to a three necked flask equipped with a stirrer. After stirring under a flow of nitrogen gas, commercial co-monomer was added to the emulsion with continued vigorous stirring. The weight % of the commercial co-monomer is based on the total weight of the organic functional group in the emulsion. This is determined by adding the mass of the commercial monomer plus the mass of the organic functional group on the hybrid monomer. The weight of the inorganic component (heteropoly acid) is not taken into account when calculating the weight percent of organic monomers. A surfactant, sodium lauryl sulfate, was added to the emulsion.

A redox initiating system is incorporated into the emulsion with the addition of a small amount of potassium or sodium persulfate, tert-butyl hydroperoxide, and sodium metabisulfite. The weight percents of initiator components added is based on the total weight of the organic functional groups present in the monomers as described above. A trace amount of iron II sulfate is added to provide $Fe^{2+}$ ions which are known to catalyze the redox initiators. Polymerization occurs at room temperature or below with the addition of these redox initiators. After about 15 minutes of the polymerization reaction occurring near room temperature, the temperature of the flask was raised to about 70-80° C. with continued rapid stirring to facilitate complete polymerization with excess potassium or sodium persulfate acting as a thermal initiator. Typically, thick white latex liquid was formed. Along with the latex, a coagulum of white polymer formed around the stirrer. When an acid form of the methacryl monomer was used, very little latex was formed and the white coagulum formed immediately when the redox initiator was added to the emulsion. Table 4 lists the redox emulsion hybrid polymers that were synthesized. These polymerizations formed pliable membranes when the coagulum was pressed between Teflon sheets in a Tee shirt press at 80 psi and 100° C. for 130 seconds.

water cooled condenser. Nitrogen is bubbled through the water for 15 minutes to remove any oxygen. Then 0.3116 g of $HSiW_{11}(methacryl)_4$ monomer was added to the flask with stirring, forming a slightly cloudy white suspension with much of the monomer dissolving. Then 0.040 g of sodium lauryl sulfate was added. The suspension turned milky white. The suspension was allowed to stir under nitrogen flow for 15 minutes. Then 4.3 mL of EA monomer, 0.020 g of sodium persulfate and 0.080 mL of $FeSO_{4(aq)}$ (0.15 g $FeSO_4.7H_2O$ in 100 mL of $H_2O$) was added to the reaction mixture. The reaction temperature remained around 20° C. Then 1 drop of tert-butylhydroperoxide (TBH) and 0.020 g of sodium metabisulfite was added. A white get type polymer immediately formed and the temperature rose to about 27° C. A small amount of liquid latex was formed. The water bath surrounding the flask was heated to boiling and the reaction temperature reached about 60-65° C. The water bath was allowed to cool and the reaction temperature was maintained between 60-70° C. for ½ hour. A small amount of white liquid latex and a solid polymer gel was obtained.

A further method to synthesize hybrid polymers using redox aqueous solution polymerization with water soluble co-monomers was developed. The new technique for solution polymerization is compatible with the water solubility of the HPA co-monomers. The membranes produced by this technique have good integrity and show promise for fuel cell applications. The HPA co-monomers are dissolved in solutions of water soluble co-monomers or directly in the water soluble co-monomers themselves. Then a water soluble initiator is added to the HPA co-monomer/water soluble co-monomer solution. The solution is quickly cast between two siliconized mylar sheets to prevent oxygen from interfering with the reaction. The cast monomer is allowed to cure between the mylar sheets under a uv lamp. After curing under

TABLE 4

Redox Emulsion Polymers

| Monomer | Co-monomer | Initiator System | Results |
|---|---|---|---|
| $TMASiW_{11}(methacryl)_2$ | BMA (96 wt %) | PP (0.6 wt %) SMBS (5 wt %) TBH (trace) | White thick latex, White coagulum pressed with heat forms a white brittle membrane. Latex cast forms a white brittle and flaky membrane |
| $TMASiW_{11}(methacryl)_2$ | BA (99.5 wt %) | PP (0.6 wt %) SMBS (0.5 wt %) TBH (trace) | White liquid latex, White coagulum pressed with heat to form a white pliable, stretchy, sticky membrane |
| $TBASiW_{11}(methacryl)_2$ | BA (99 wt %) | PP (0.6 wt %) SMBS (0.5 wt %) TBH (trace) | White liquid latex, White coagulum pressed with heat to form a white pliable, stretchy, sticky membrane |
| $HSiW_{11}(methacryl)_4$ | EA (98.6 wt %) | SP (0.5 wt %) SMBS (0.5 wt %) TBH (trace) | Very little liquid latex, white coagulum immediately forms, pressed with heat to form a white, pliable, stretchy, sticky membrane |

Abbreviations: BMA—butyl methacrylate, BA—butyl acrylate, EA—ethyl acrylate, PP—potassium persulfate, SMBS—sodium metabisulfite, SP—sodium persulfate, TBH—tert-butyl hydroperoxide A specific example of a redox emulsion polymerization is the synthesis of $HSiW_{11}(methacryl)_4$/HA co-polymer (sample JLH-14-51b). This polymer contains 7 wt % $HSiW_{11}(methacryl)_4$ co-monomer and 93 wt % HA co-monomer. The code assigned to this polymer is PolyPOM7m. In this reaction, 7.53 mL of D.I. water is added to a 3 neck reaction flask equipped with a stirbar, a nitrogen inlet, a thermometer and a the lamp for 2-24 hours, the polymer membranes can be easily removed from the siliconized mylar film.

The membranes are made from either tetrabutyl ammonium (TBA) salts or potassium salts of the HPA monomers or from the acid form of the HPA monomers. The TBA-HPA form of the polymer membranes are generally clear to hazy in color. The acid-HPA form of the polymer membranes start out hazy or clear in color, but over a matter of hours, they turn blue in color. This is because the HPA is becoming reduced in the polymer. This blue color is a good indication that the HPA's are present in the polymer. Over time, especially exposed to air, the membranes can turn clear again. Table 5 lists the membranes synthesized.

TABLE 5

| Polymer (shortcut name) | Wt % HPA Monomer | Description |
|---|---|---|
| TBASiW10(methacryl)2/HEA co-polymer | 8%, 9%, 16% | white or clear membrane |
| HSiW11(styryl)2/HEM copolymer | 16% | brittle blue membrane |
| TBASiW11(methacryl)2/HEM co-polymer | 2%, 12% | slightly brittle blue or clear membrane |
| HSiW11(styryl)2/CEA co-polymer | 12% | blue membrane |
| TBASiW11(methacryl)2/CEA co-polymer | 9% | yellow brittle membrane |
| TBASiW11(methacryl)2/HEA co-polymer | 7%, 10% | white membrane |
| HSiW11(methacryl)2/HEA co-polymer | 5%, 50% | clear or dark blue membrane |
| KSiW11(methacryl)2/HEA co-polymer | 14%, 16% | blue membrane |
| HSiW11(styryl)2/HEA co-polymer | 41% | brittle blue membrane |

Figure 12:
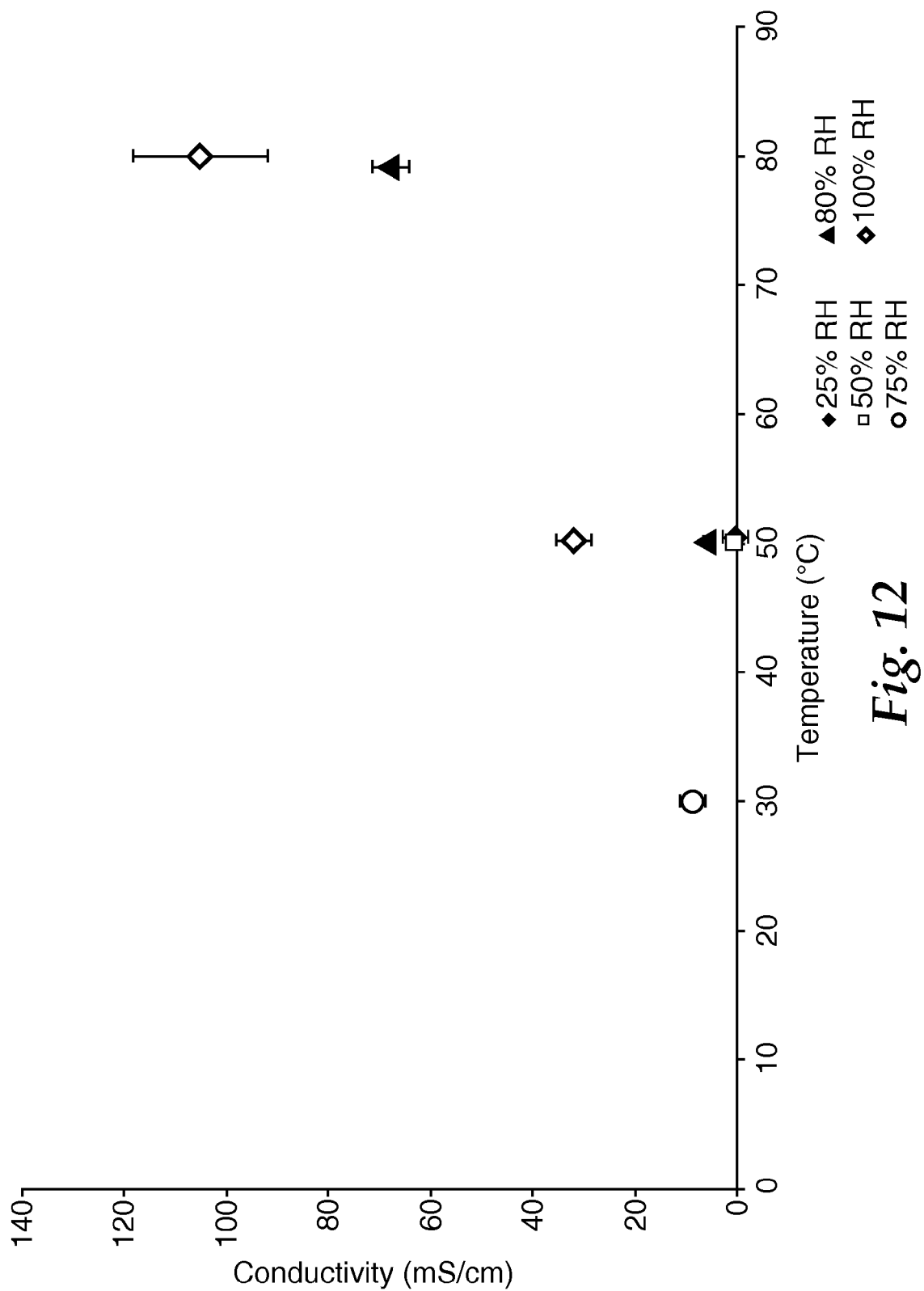
FIG. 12 is a graph of proton conductivity measurements of $HSiW_{11}(methacryl)_2$/HEA copolymer membrane over a range of temperatures and humidities, as described in Example 2.

A specific example of redox aqueous solution polymerization is the synthesis of $HSiW_{11}(methacryl)_2$/HEA co-polymer membrane (sample JLH-14-172a). This polymer contains 50 wt % $HSiW_{11}(methacryl)_2$ co-monomer and 50 wt % HEA. This polymer has a code of PolyPOM50m. $HSiW_{11}$ $(methacryl)_2$ monomer (1.7296 g) was mixed with 1.7127 g of HEA and 1.2306 g of D.I. $H_2O$ in a small vial. Argon gas was bubbled through the solution for 30 minutes to degas the solution and remove $O_2$. Then 0.066 mL of 1-hydroxycyclohexyl phenyl ketone (HCPK) was added to the vial and quickly swirled. The solution was cast between two siliconized mylar sheets and placed under a uv lamp for 24 hours. A dark blue colored membrane was formed which is slightly stretchy and pliable. This membrane was suitable for use in the conductivity apparatus to measure proton conduction (see FIG. 12, which represents proton conductivity measurements of $HSiW_{11}(methacryl)_2$/HEA copolymer membrane over a range of temperatures and humidities.).

We claim:

1. A polymer electrolyte membrane comprising:
   a) a fluorinated polymer electrolyte;
   b) a polyoxometalate; and
   c) a counterion to the polyoxometalate;
   wherein the polyoxometalate comprises a transition metal selected from the group consisting of Mn and Ce.

2. The polymer electrolyte composition according to claim 1 wherein the polyoxometalate comprises Mn.

3. The polymer electrolyte composition according to claim 1 wherein the polyoxometalate comprises Ce.

4. The polymer electrolyte composition according to any of claims 1-3 wherein the polyoxometalate is a heteropolyacid.

5. A fuel cell polymer electrolyte membrane comprising the polymer electrolyte composition of claim 1.

6. A fuel cell membrane electrode assembly comprising the polymer electrolyte composition of claim 1.

7. A polymer electrolyte which comprises first pendent groups which comprise a covalently bound polyoxometalate accompanied by a counterion to the polyoxometalate, wherein the polyoxometalate comprises Ce.

8. The polymer electrolyte according to claim 7 wherein the counterion to the polyoxometalate is selected from the group consisting of Mn cations and Ce cations.

9. The polymer electrolyte according to claim 7 wherein the counterion to the polyoxometalate is a Mn cation.

10. The polymer electrolyte according to claim 7 wherein the counterion to the polyoxometalate is a Ce cation.

11. The polymer electrolyte according to claim 7 which is fluorinated.

12. The polymer electrolyte according to claim 7 which comprises a second acidic functional group other than a polyoxometalate.

13. The polymer electrolyte according to claim 12 wherein the second acidic functional group is selected from the group consisting of phosphonic acids, sulfonic acids and bissulfonyl imides.

14. The polymer electrolyte according to claim 7 wherein the polyoxometalate is covalently bound to the polymer through a Ti or Zr atom.

15. The polymer electrolyte according to claim 7 wherein the polyoxometalate is covalently bound to the polymer through a silane group.

16. The polymer electrolyte according to claim 7 wherein the polyoxometalate is covalently bound to the polymer through a phosphonate group.

17. A fluorinated polymer electrolyte which comprises first pendent groups which comprise a covalently bound polyoxometalate.

18. A polymer electrolyte which comprises first pendent groups which comprise a covalently bound polyoxometalate and a second acidic functional group other than a polyoxometalate.

19. The polymer electrolyte according to claim 18 wherein the second acidic functional group is selected from the group consisting of phosphonic acids, sulfonic acids and bissulfonyl imides.

20. A polymer electrolyte which comprises first pendent groups which comprise a covalently bound polyoxometalate wherein the polyoxometalate is covalently bound to the polymer through a phosphonate group.

21. A fuel cell polymer electrolyte membrane comprising the polymer electrolyte of claim 7.

22. A fuel cell membrane electrode assembly comprising the polymer electrolyte of claim 7.

23. A method of making a polymer electrolyte comprising a step of copolymerizing:
  a) a monomer comprising a covalently bound polyoxometalate which comprises Ce; with
  b) at least one comonomer.

24. A method of making a polymer electrolyte comprising the steps of:
  a) providing a polymer comprising three or more functional groups which may serve as binding sites for lacunary heteropolyacids; and
  b) covalently attaching a polyoxometalate to the polymer.

25. The method according to claim 24 comprising the steps of:
  a) providing a polymer comprising three or more silane groups; and
  b) covalently attaching a polyoxometalate to a silane group of the polymer.

26. A method of making a polymer electrolyte comprising the steps of:
  a) providing a polymer comprising phosphonic acid groups; and
  b) covalently attaching a polyoxometalate to a phosphonic acid group of the polymer.

27. A polymer electrolyte which comprises first pendent groups which comprise a covalently bound polyoxometalate accompanied by a counterion to the polyoxometalate, wherein the counterion to the polyoxometalate is selected from the group consisting of Mn cations and Ce cations.

28. The polymer electrolyte of claim 27, wherein the counterion to the polyoxometalate is a Mn cation.

29. The polymer electrolyte of claim 27, wherein the counterion to the polyoxometalate is a Ce cation.

* * * * *

UNITED STATES PATENT AND TRADEMARK OFFICE
CERTIFICATE OF CORRECTION

PATENT NO. : 8,206,874 B2
APPLICATION NO. : 12/266932
DATED : June 26, 2012
INVENTOR(S) : Steven J Hamrock Page 1 of 1

It is certified that error appears in the above-identified patent and that said Letters Patent is hereby corrected as shown below:

Title Page, item (56);

Page 2, Column 2 (Other Publications)
Line 5, delete "Dodecatungstoalumic" and insert -- Dodecatungstoaluminic --, therefor.

Column 6
Line 52, delete "Theological" and insert -- rheological --, therefor.

Column 10
Lines 38-39, delete "Dodecatungstoalumic" and insert -- Dodecatungstoaluminic --, therefor.

Column 11
Line 1, delete "form" and insert -- from --, therefor.

Line 2, delete "Gringard" and insert -- Grignard --, therefor.

Line 2, delete "Judeinstein," and insert -- Judenstein, --, therefor.

Column 14
Lines 51-52, delete "azobisisoburyrylnitrile," and insert -- azobisisobutrylnitrile, --, therefor.

Signed and Sealed this
Eleventh Day of September, 2012

David J. Kappos
*Director of the United States Patent and Trademark Office*